US009960728B2

(12) United States Patent
Ito et al.

(10) Patent No.: US 9,960,728 B2
(45) Date of Patent: May 1, 2018

(54) ROTATING ELECTRIC MACHINE WINDING TEMPERATURE ESTIMATION DEVICE AND ROTATING ELECTRIC MACHINE WINDING TEMPERATURE ESTIMATION METHOD

(71) Applicant: HONDA MOTOR CO., LTD., Tokyo (JP)

(72) Inventors: Yuta Ito, Utsunomiya (JP); Munehiro Matsubara, Shimotsuga-gun (JP); Hiroyuki Matsuoka, Yokkaichi (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days. days.

(21) Appl. No.: 15/318,394

(22) PCT Filed: Jun. 25, 2015

(86) PCT No.: PCT/JP2015/068341
§ 371 (c)(1),
(2) Date: Dec. 13, 2016

(87) PCT Pub. No.: WO2015/199176
PCT Pub. Date: Dec. 30, 2015

(65) Prior Publication Data
US 2017/0133972 A1    May 11, 2017

(30) Foreign Application Priority Data
Jun. 27, 2014  (JP) .................................. 2014-133195

(51) Int. Cl.
*H02H 7/08*   (2006.01)
*H02P 29/64*  (2016.01)
(Continued)

(52) U.S. Cl.
CPC .............. *H02P 29/64* (2016.02); *G06F 17/11* (2013.01); *H02K 1/16* (2013.01); *H02K 9/193* (2013.01); *H02K 11/25* (2016.01)

(58) Field of Classification Search
CPC ........ H02H 7/20209; H02H 5/04; H02H 7/08; H02H 7/085; H02H 7/0852; H02H 6/005;
(Continued)

(56) References Cited

U.S. PATENT DOCUMENTS 5,158,436 A * 10/1992 Jensen ................. H02H 7/0833
                                                          417/32
5,726,559 A *  3/1998 Taniguchi ............... H02J 7/242
                                                          322/20
(Continued)

FOREIGN PATENT DOCUMENTS

JP    2001-318008 A    11/2001
JP    2003-134869 A     5/2003
(Continued)

OTHER PUBLICATIONS

International Search Report dated Sep. 8, 2015, issued in counterpart application No. PCT/JP2015/069341, w/ English translation. (4 pages).

*Primary Examiner* — Rina Duda
(74) *Attorney, Agent, or Firm* — Westerman, Hattori, Daniels & Adrian, LLP

(57) ABSTRACT

A winding temperature estimation device for a rotating electric machine includes a rotating electric machine including a stator, which has a winding, and a rotor, a coolant supply part configured to supply a coolant, a temperature sensor configured to detect a temperature of the coolant, a heat reduction amount calculation part configured to calculate a heat reduction amount of the winding using the temperature of the coolant and a heat resistance between the coolant and the winding, a heating value calculation part
(Continued)

configured to calculate a heating value due to a loss of the winding, and a winding temperature calculation part configured to calculate a temperature of the winding using the heat reduction amount from the winding and the heating value due to the loss of the winding.

5 Claims, 8 Drawing Sheets

(51) Int. Cl.
*H02K 9/193* (2006.01)
*H02K 11/25* (2016.01)
*H02K 1/16* (2006.01)
*G06F 17/11* (2006.01)

(58) Field of Classification Search
CPC ........ H05K 7/20209; H02J 7/242; H02J 7/16; H02J 7/24
USPC ........ 318/727, 471, 400.21, 400.22; 388/934
See application file for complete search history.

(56) References Cited

U.S. PATENT DOCUMENTS

| | | | |
|---|---|---|---|
| 6,909,349 B1* | 6/2005 | Longardner | F25B 15/00 |
| | | | 29/602.1 |
| 7,742,305 B2* | 6/2010 | Schweigert | H02M 1/32 |
| | | | 361/103 |
| 2002/0006154 A1 | 1/2002 | Nada | |
| 2003/0076065 A1 | 4/2003 | Shafer et al. | |
| 2009/0189561 A1 | 7/2009 | Patel et al. | |
| 2010/0230189 A1* | 9/2010 | Cottrell, V | B60K 11/02 |
| | | | 180/65.21 |

FOREIGN PATENT DOCUMENTS

| | | |
|---|---|---|
| JP | 2004-100525 A | 4/2004 |
| JP | 2006-50746 A | 2/2006 |
| JP | 2010-180777 A | 8/2010 |
| JP | 2013-85388 A | 5/2013 |
| JP | 5193012 B2 | 5/2013 |
| JP | 2013-146155 A | 7/2013 |

* cited by examiner

ROTATING ELECTRIC MACHINE WINDING TEMPERATURE ESTIMATION DEVICE AND ROTATING ELECTRIC MACHINE WINDING TEMPERATURE ESTIMATION METHOD

TECHNICAL FIELD

The present invention relates to a winding temperature estimation device for a rotating electric machine and a winding temperature estimation method for a rotating electric machine.

Priority is claimed on Japanese Patent Application No. 2014-133195, filed Jun. 27, 2014, the contents of which are incorporated herein by reference.

BACKGROUND ART

In the related art, a motor in which a conductor divided into a plurality of segments (a so-called SC winding: a segment conductor winding) is inserted into a slot to cover the slot with no gap according to a shape of the slot is known as a motor having a stator having a slot in which a winding is inserted. In the motor, because a space factor of the winding in the slot is increased, it is difficult to easily detect a winding temperature in the slot, and the winding temperature in the slot may be indirectly estimated from a winding temperature detected at a coil end or the like outside the slot. However, since heat generation is increased due to an increase in a space factor of the winding, cooling of the winding by a coolant at the coil end or the like outside the slot may be performed, and thus, it may be difficult to precisely estimate the winding temperature in the slot from the winding temperature outside the slot.

With respect to the occurrence of such a problem, in the related art, a technology in which temperature dependency of each of a winding resistance value and a winding inductance of a motor is linear, and a winding temperature is estimated using a voltage equation of the motor is known (for example, see Patent Document 1).

In addition, in the related art, in a case in which the winding temperature of the motor gets high during a restart of an operation due to turning on an ignition switch of a vehicle, a temperature estimation device using a temperature difference between the surrounding temperature of the winding and a temperature estimation value based on the winding resistance as an initial value of a temperature increase estimation value is known (for example, see Patent Document 2).

PRIOR ART DOCUMENTS

Patent Documents

Patent Document 1: Japanese Unexamined Patent Application, First Publication No. 2013-146155
Patent Document 2: Japanese Patent No. 5193012

SUMMARY OF INVENTION

Problems to be Solved by the Invention

However, in the device according to the above-mentioned related art, the temperature dependency of the winding resistance value of the motor merely shows a correspondence between the winding resistance value and an average temperature of the winding temperature. For this reason, appropriate temperature estimation according to a deviation of the winding temperature due to cooling in a high temperature section of the winding, an iron loss of a stator core, and the like cannot be easily performed. Further, since a contribution of a magnet temperature is relatively high and a contribution of the winding temperature is relatively low with respect to the temperature dependency of the winding inductance, it is difficult to appropriately estimate temperature distribution of the winding which varies due to cooling of the winding, an iron loss of the stator core, and the like.

In addition, in the temperature estimation device according to the above-mentioned related art, in response to a non-driving state of the motor and peripheral devices of the motor, for example, during a restart of the vehicle or the like, temperature estimation is merely performed using a surrounding temperature of the winding and a temperature estimation value based on the winding resistance. That is, according to the temperature estimation device, the temperature estimation is merely performed using copper loss or the like of the winding in response to simplified operating conditions in a starting state or the like of the vehicle. For this reason, the temperature estimation cannot be precisely performed to correspond to complex operating conditions in an actual operating state of the vehicle.

In consideration of the above-mentioned circumstances, an object of the aspect of the present invention is to provide a winding temperature estimation device for a rotating electric machine and a winding temperature estimation method for a rotating electric machine that are capable of improving estimation precision of a winding temperature of the rotating electric machine.

Means for Solving the Problems

In order to solve the above-mentioned technical problems, the present invention employs the following aspects.

(1) A winding temperature estimation device for a rotating electric machine according to an aspect of the present invention includes a rotating electric machine including a stator, which has slots and a winding configured with a plurality of segmented conducting wires inserted into the slots according to a shape of the slots, and a rotor, a coolant supply part configured to supply a coolant to the winding and the stator; a temperature sensor configured to detect a temperature of the coolant; a heat reduction amount calculation part configured to calculate a heat reduction amount from the winding using the temperature of the coolant and a heat resistance of at least a portion between the coolant and the winding; a heating value calculation part configured to calculate a heating value due to a loss of the winding; and a winding temperature calculation part configured to calculate a temperature of the winding using the heat reduction amount from the winding and the heating value due to the loss of the winding.

(2) In the aspect of (1), the heating value calculation part may include a stator heating value calculation part configured to calculate a heating value due to an iron loss of the stator, the heat reduction amount calculation part may include a stator temperature calculation part configured to calculate a temperature of the stator using the heating value due to the iron loss of the stator, the temperature of the coolant, and a heat resistance between the coolant and the stator, and the heat reduction amount from the winding may be calculated using the temperature of the stator, a heat resistance between the stator and the winding, the temperature of the coolant, and the heat resistance between the coolant and the winding.

(3) In the aspect of (1) or (2), the heat reduction amount calculation part may calculate the heat resistances according to a flow rate of the coolant and number of revolutions of the rotating electric machine.

(4) In any one aspect of (1) to (3), the heating value calculation part may calculate a heating value due to a copper loss and eddy current loss of the winding.

(5) A winding temperature estimation method for a rotating electric machine according to an aspect of the present invention is performed by a control device with respect to a rotating electric machine including a stator, which has slots and a winding constituted by a plurality of segmented conducting wires inserted into the slots according to a shape of the slots, and a rotor; a coolant supply part configured to supply a coolant to the winding and the stator; a temperature sensor configured to detect a temperature of the coolant, a heat reduction amount calculation part configured to calculate a heat reduction amount from the winding using the temperature of the coolant and a heat resistance of at least a portion between the coolant and the winding; and a heating value calculation part configured to calculate a heating value due to a loss of the winding, wherein the winding temperature estimation method for a rotating electric machine includes: calculating a temperature of the winding using the heat reduction amount of the winding and the heating value due to the loss of the winding by the control device.

Advantageous Effects of Invention

The winding temperature estimation device for a rotating electric machine according to the aspect of the above mentioned (1) includes the winding temperature calculation part configured to calculate the temperature of the winding using the temperature of the coolant supplied to the winding and the stator. For this reason, calculation precision of the temperature of the winding can be improved. In addition, the winding temperature estimation device for a rotating electric machine according to the aspect of the above mentioned (1) includes the winding temperature calculation part using a heat model in which the coolant cools the winding and the stator outside the slot. For this reason, the temperature of the winding can be precisely calculated according to a cooling path of the coolant in the rotating electric machine and a cooling state of the winding and the stator by the coolant.

Further, in the aspect of the above mentioned (2), the heat reduction amount calculation part configured to calculate the heat reduction amount (i.e., the radiation amount) from the winding using the temperature of the stator having a strong thermal relation with the winding in the slot may be provided. For this reason, the radiation amount from the winding by the coolant can be precisely calculated.

Further, in the aspect of the above mentioned (3), the heat reduction amount calculation part configured to calculate the heat resistance of at least a portion between the coolant and the winding according to the flow rate of the coolant and the number of revolutions of the rotating electric machine may be provided. For this reason, the heat resistance in the heat model in which the coolant cools the winding and the stator can be precisely calculated.

Further, in the aspect of the above mentioned (4), the heating value calculation part configured to calculate the heating value due to the copper loss and eddy current loss of the winding may be provided. For this reason, a temperature variation according to the heating value of the winding can be precisely calculated.

In the winding temperature estimation method for a rotating electric machine according to the aspect of the above mentioned (5), since calculating the temperature of the winding using the temperature of the coolant supplied to the winding and the stator is included, calculation precision of the temperature of the winding can be improved Since using the heat model in which the coolant cools the winding and the stator outside the slot or the like is included, the temperature of the winding can be precisely calculated according to the cooling path of the coolant in the rotating electric machine and the cooling state of the winding and the stator by the coolant.

DESCRIPTION OF EMBODIMENT

Hereinafter, a winding temperature estimation device for a rotating electric machine and a winding temperature estimation method for a rotating electric machine according to an embodiment of the present invention will be described with reference to the accompanying drawings.

Figure 1:
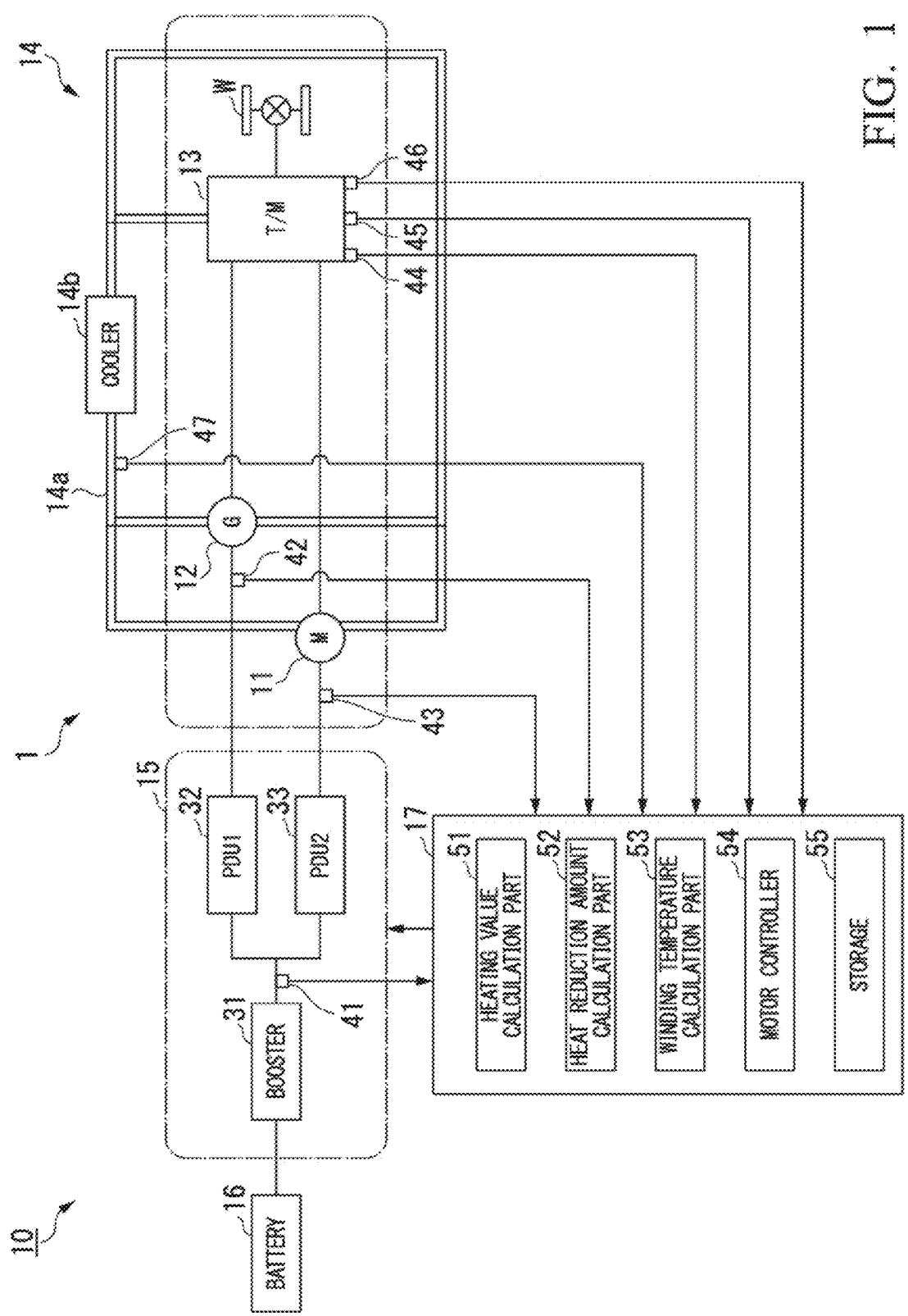
FIG. 1 is a configuration view of a winding temperature estimation device for a rotating electric machine according to an embodiment of the present invention.

A winding temperature estimation device 10 for a rotating electric machine according to the embodiment is mounted on a vehicle 1 such as a hybrid vehicle, an electrically driven vehicle, or the like. As shown in FIG. 1, the vehicle 1 includes a driving motor (M) 11 (a rotating electric machine), a generating motor (G) 12, a transmission (T/M) 13, a coolant circulation section 14 (a coolant supply part), a power conversion part 15, a battery 16 and a control device 17.

Each of the driving motor 11 and the generating motor 12 is, for example, a 3-phase alternating brushless DC motor or the like. Each of the driving motor 11 and the generating motor 12 includes a rotary shaft connected to the transmission 13. The rotary shaft of the generating motor 12 is connected to a mechanical pump of the coolant circulation section 14, which will be described below.

Figure 2:
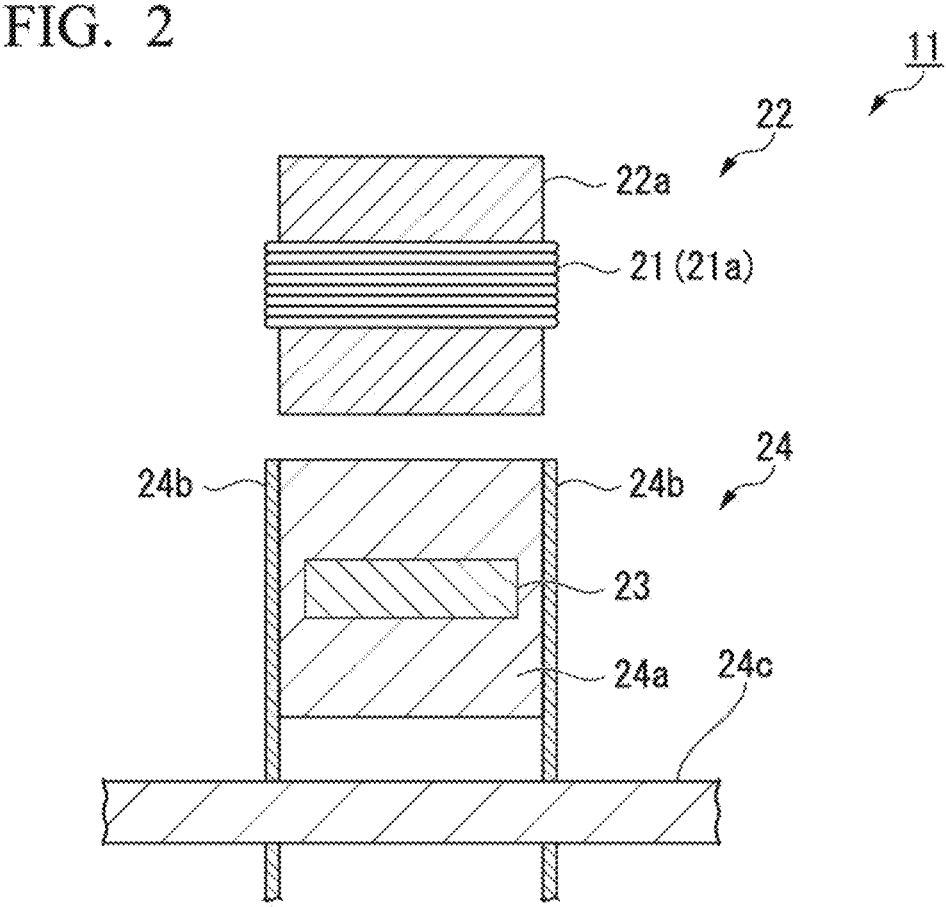
FIG. 2 is a cross-sectional view showing a partial configuration of a driving motor of the winding temperature estimation device for a rotating electric machine according to the embodiment of the present invention.

As shown in FIG. 2, the driving motor 11 includes a stator 22 having a coil 21, and a rotor 24 having a magnet 23. The driving motor 11 is an inner rotor type and includes the rotor 24 in the stator 22 having a cylindrical shape.

The coil 21 is a segment conductor (SC) winding. The coil 21 is mounted in slots 22c formed between neighboring teeth 22b of a stator core 22a. The coil 21 is connected to the power conversion part 15, which will be described below. The magnet 23 is, for example, a permanent magnet or the like.

The magnet 23 is held in a rotor yoke 24a not to come into direct contact with a pair of end surface plates 24b that sandwich the rotor yoke 24a from both sides in an axial direction of a rotary shaft 24c.

The generating motor 12 includes, for example, the same configuration as the driving motor 11.

Figure 3:
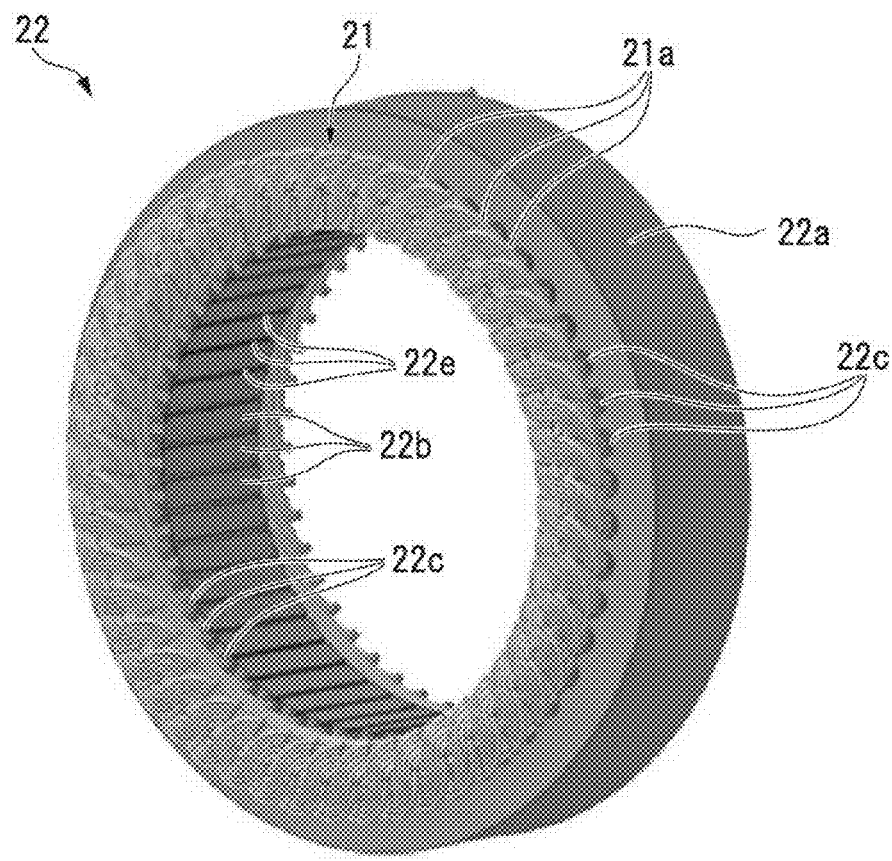
FIG. 3 is a perspective view showing a configuration of a stator of the driving motor of the winding temperature estimation device for a rotating electric machine of the embodiment of the present invention.

As shown in FIG. 3, an external shape of the stator core 22a is a cylindrical shape. The stator core 22a includes a plurality of teeth 22b formed at an inner circumferential section in a radial direction. Each of the plurality of teeth 22b protrudes from the inner circumferential section of the stator core 22a toward an inner circumferential side at predetermined intervals in a circumferential direction. A plurality of slots 22c through which the stator core 22a passes in a direction of a rotary shaft are formed at the inner circumferential section of the stator core 22a. Each of the slots 22c is formed between the teeth 22b neighboring in the circumferential direction. Each of the slots 22c is formed such that a cross-sectional shape in the radial direction of the stator core 22a radially extends from the inner circumferential side toward an outer circumferential side of the stator core 22a. The slots 22c are connected to the inner circumferential surface of the stator core 22a via slits 22e formed in inner circumferential side distal ends of the neighboring teeth 22b. Moreover, the slits 22e may be omitted.

Figure 4:
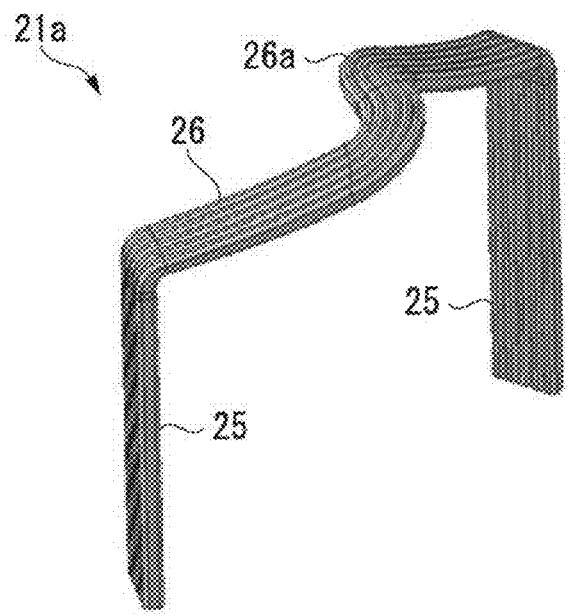
FIG. 4 is a perspective view showing a configuration of segmented conducting wires (segment coils) of the stator of the driving motor of the winding temperature estimation device for a rotating electric machine according to the embodiment of the present invention.

The coil 21 is a 3-phase coil constituted by a U phase, a V phase and a W phase. The coil 21 includes a plurality of segment coils 21a. As shown in FIG. 4, each of the segment coils 21a includes a plurality of (for example, 5) conducting wires (for example, rectangular wires or the like) of which a cross-sectional shape is a rectangular shape. For example, the plurality of conducting wires are arranged in a row to oppose a surface in a widthwise direction of each of the conducting wires to form a bundle. An external shape of each of the segment coils 21a is formed in a U shape such that the slot 22c is buried with no gap according to the shape of each of the slots 22c.

Each of the segment coils 21a includes a pair of leg sections 25 and a head section 26 configured to connect the pair of leg sections 25. In each of the segment coils 21a, the pair of leg sections 25 are inserted into two slots 22c disposed at predetermined intervals in the circumferential direction from the axial direction of the stator core 22a. Each of the pair of leg sections 25 includes protrusions 25a protruding from an inside to an outside of each of the slots 22c. Each of the protrusions 25a is torsionally bent outside at each of the slots 22c in the circumferential direction. The head section 26 includes an S-shaped section 26a curved in an S shape in an arrangement direction of the plurality of conducting wires.

Figure 5:
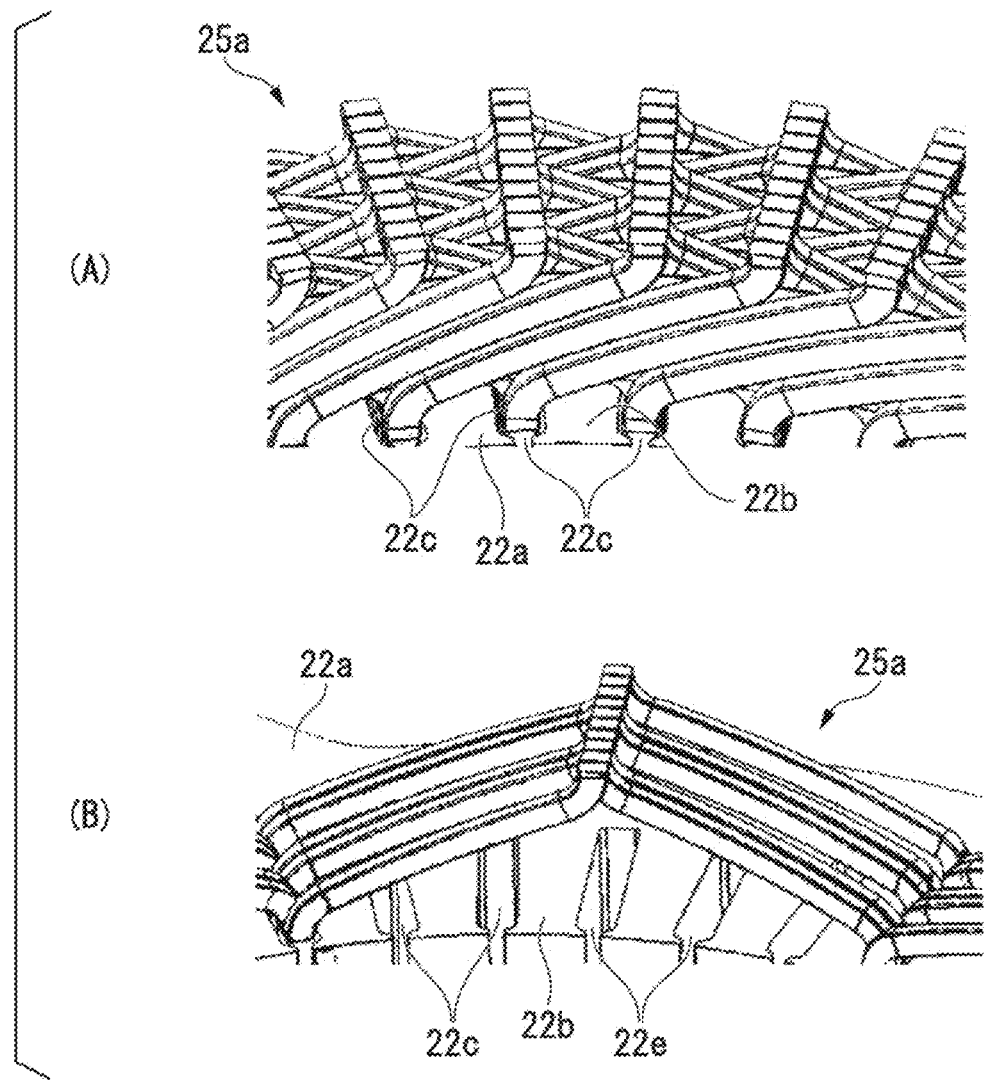
FIG. 5 shows a configuration of protrusions of the segmented conducting wires (the segment coils) of the stator of the driving motor of the winding temperature estimation device for a rotating electric machine according to the embodiment of the present invention, (A) is a view showing some of a plurality of segmented conducting wires (segment coils) and (B) is a perspective view showing some of the segmented conducting wires (the segment coils) of a U phase.

As shown in FIGS. 5(A) and 5(B), a predetermined combination of the protrusions 25a in the plurality of protrusions 25a protruding from the inside toward the outside of the plurality of slots 22c are adhered by TIG welding or the like. A plurality of leg sections 25 inserted into the plurality of slots 22c are disposed in sequence of a U phase, a U phase, a V phase, a V phase, a W phase, a W phase, a U phase, a U phase, . . . in the circumferential direction.

The transmission 13 is, for example, an automatic transmission (AT) or the like. The transmission 13 is connected to the driving motor 11, the generating motor 12 and driving wheels W. The transmission 13 controls power transmission between the driving wheels W and each of the driving motor 11 and the generating motor 12 according to a control signal output from the control device 17, which will be described below.

The coolant circulation section 14 includes a coolant flow path 14a through which a coolant circulates, and a cooler 14b configured to cool the coolant. The coolant circulation section 14 uses, for example, working oil for performing lubrication, power transmission, and so on in the transmission 13 of the automatic transmission (AT) as coolant.

The coolant flow path 14a is connected to a flow path of the working oil in the transmission 13 and the inside of each of the driving motor 11 and the generating motor 12. The coolant flow path 14a includes an ejection port (not shown) configured to eject the coolant to each of the driving motor 11 and the generating motor 12, and a suction port (not shown) configured to suction the coolant flowing through the inside of each of the driving motor 11 and the generating motor 12.

The ejection port of the coolant flow path 14a is disposed over each of the driving motor 11 and the generating motor 12 in the vertical direction. The suction port of the coolant flow path 14a is disposed at a coolant storage section (not shown) formed under each of the driving motor 11 and the generating motor 12 in the vertical direction.

The cooler 14b includes a mechanical pump installed at the coolant flow path 14a and connected to the rotary shaft of the generating motor 12. The mechanical pump generates a suction force by driving of the generating motor 12 and causes the coolant in the coolant flow path 14a to flow toward the ejection port while suctioning the coolant from the suction port of the coolant flow path 14a. The cooler 14b cools the coolant flowing through the coolant flow path 14a.

The coolant circulation section 14 ejects the coolant from the ejection port of the coolant flow path 14a toward the coil end of the coil 21 (a portion protruding outward from the slot 22c of the stator core 22a in the axial direction thereof) according to an operation of the mechanical pump of the cooler 14b with respect to the driving motor 11.

The coolant flows downward in the vertical direction on the coil end of the coil 21 and a surface of the stator core 22a by an action of gravity. The coolant flows downward in the vertical direction such that the coolant is dropped from the coil end of the coil 21 or the stator core 22a onto the end surface plates 24b via a gap between the stator 22 and the rotor 24 by the action of gravity. The coolant (dropped coolant) dropped onto the surfaces of the end surface plates 24b flows on the surfaces of the end surface plates 24b to an outside of the end surface plates 24b by a centrifugal force due to a rotation of the rotor 24 and gravity. The dropped coolant flows into the coolant storage section from the outside of the end surface plates 24b by the action of gravity.

Figure 6:
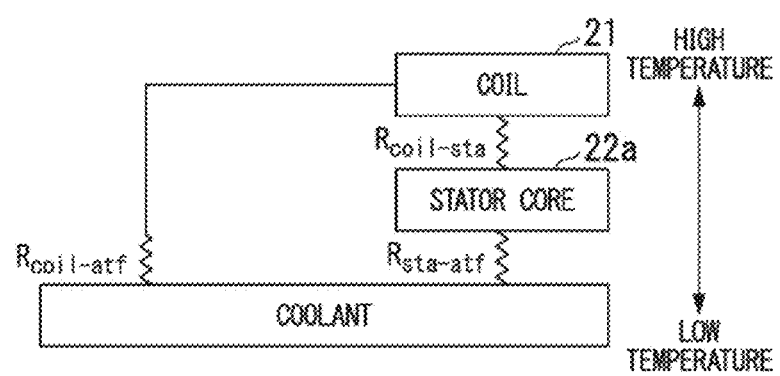
FIG. 6 is a view schematically showing a heat model of the stator of the winding temperature estimation device for a rotating electric machine according to the embodiment of the present invention.

The coolant circulation section 14 suctions the coolant stored in the coolant storage section from the suction port into the coolant flow path 14a by a suction of the mechanical pump, and performs cooling by the cooler 14b. Accordingly, as shown in FIG. 6, the coolant circulation section 14 cools the coil 21 and the stator core 22a using the coolant. The coolant circulation section 14 directly cools the end surface plates 24b using the dropped coolant, and indirectly and sequentially cools the rotor yoke 24a and the magnet 23 via the end surface plates 24b using the dropped coolant.

The power conversion part 15 includes a booster 31 configured to increase an output voltage of a battery 16, a second power drive unit (PDU2) 33 configured to control electrical conduction of the driving motor 11, and a first power drive unit (PDU1) 32 configured to control electrical conduction of the generating motor 12.

The booster 31 includes, for example, a DC-DC converter or the like. The booster 31 is connected between the battery 16 and the first and second power drive units 32 and 33.

The booster 31 generates a voltage applied to the first and second power drive units 32 and 33 by increasing an output voltage of the battery 16 according to a control signal output from the control device 17, which will be described below. The booster 31 outputs the applied voltage generated by increasing the output voltage of the battery 16 to the first and second power drive units 32 and 33.

The first and second power drive units 32 and 33 include, for example, inverter devices or the like. The first and second power drive units 32 and 33 include a bridge circuits and smoothing condensers formed by, for example, bridging and connecting a plurality of switching elements (for example, MOSFETs or the like) as inverter devices. The first and second power drive units 32 and 33 convert direct current output power of the booster 31 into 3-phase alternating current power according to a control signal output from the control device 17, which will be described below. The first power drive unit 32 electrically conducts a 3-phase alternating current to the 3-phase coil 21 such that electrical conduction to the generating motor 12 is sequentially commutated. In addition, the second power drive unit 33 electrically conducts a 3-phase alternating current to the 3-phase coil 21 such that electrical conduction to the driving motor 11 is sequentially commutated.

The control device 17 is configured with a central processing unit (CPU), various storage media such as a random access memory (RAM) or the like, and an electronic circuit such as a timer or the like. The control device 17 outputs a control signal to control the transmission 13 and the power conversion part 15. The control device 17 is connected to a voltage sensor 41, a first current sensor 42, a second current sensor 43, a first number-of-revolutions sensor 44, a second number-of-revolutions sensor 45, a torque sensor 46 and a coolant temperature sensor 47.

The voltage sensor 41 detects the applied voltage applied to each of the first and second power drive units 32 and 33 from the booster 31. The first current sensor 42 detects an alternating current (a phase current) flowing between the first power drive unit 32 and each of the coil 21 of the generating motor 12. The second current sensor 43 detects an alternating current (a phase current) flowing between the second power drive unit 33 and each of the coil 21 of the driving motor 11.

The first number-of-revolutions sensor 44 detects the number of revolutions of the driving motor 11 by sequentially detecting a rotation angle of the rotary shaft of the driving motor 11. The second number-of-revolutions sensor 45 detects the number of revolutions of the generating motor 12 by sequentially detecting a rotation angle of the rotary shaft of the generating motor 12.

The torque sensor 46 detects torque of the driving motor 11. The coolant temperature sensor 47 detects a temperature of the coolant output from the cooler 14b in the coolant flow path 14a (the coolant temperature after passing through the cooler).

As shown in FIG. 1, the control device 17 includes a heating value calculation part 51 (a stator heating value calculation part), a heat reduction amount calculation part 52 (a stator temperature calculation part), a winding temperature calculation part 53, a motor controller 54 and a storage 55.

The heating value calculation part 51 calculates a heating value due to a loss of each part in each of the driving motor 11 and the generating motor 12.

The heating value calculation part 51 calculates, for example, heating values of copper loss and eddy current loss of the 3-phase coil 21 and an iron loss of the stator core 22a (hereinafter, simply referred to as an copper loss $W1_{coil}$, an eddy current loss $W2_{coil}$ and an iron loss $W_{sta}$) in the driving motor 11.

The heating value calculation part 51 calculates the copper loss $W1_{coil}$ of the 3-phase coil 21 according to a 3-phase current I of the driving motor 11 detected by the second current sensor 43, a resistance value R of the 3-phase coil 21 previously stored in the storage 55, a temperature (a last count) $T_{coil(pre)}$ of the coil 21, and a predetermined coefficient a and a predetermined temperature $T_0$ as expressed in the following Equation (1).

$$W1_{coil}=I^2+R\times\{1+a\times(T_{coil(pre)}-T_0)\} \qquad \text{[Math. 1]}$$

The heating value calculation part 51 calculates the eddy current loss $W2_{coil}$ of the coil 21 according to the applied voltage detected by the voltage sensor 41, the number of revolutions of the driving motor 11 detected by the first number-of-revolutions sensor 44, and the torque of the driving motor 11 detected by the torque sensor 46.

Figure 7:
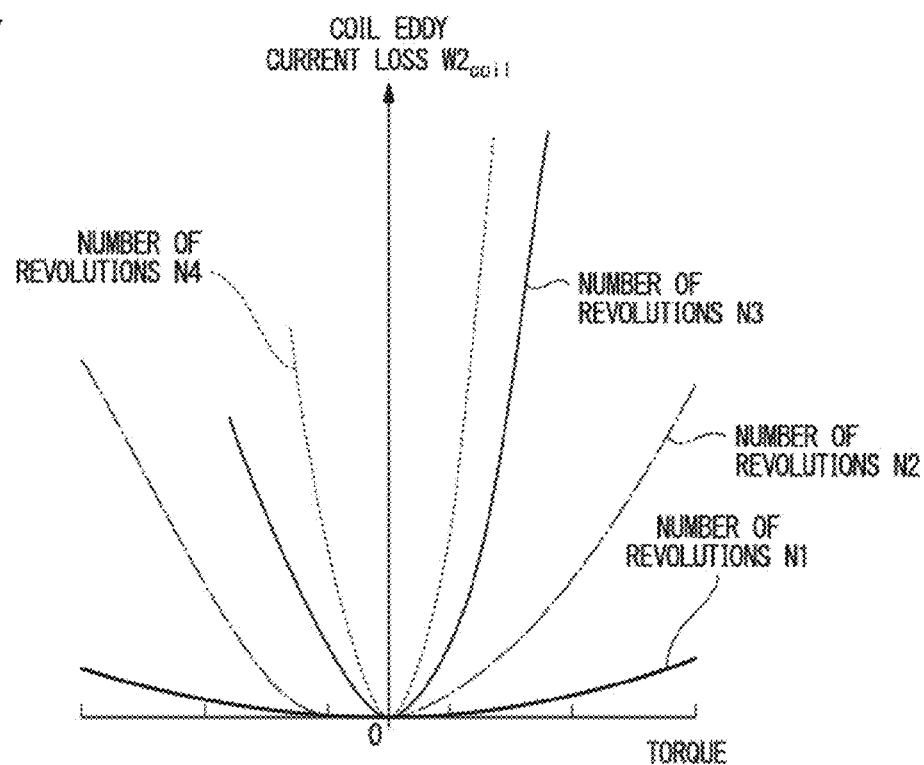
FIG. 7 is a view showing a mutual relationship between the number of revolutions, torque, and eddy current loss of a coil in the driving motor of the winding temperature estimation device for a rotating electric machine according to the embodiment of the present invention.

The heating value calculation part 51 previously stores data such as a map or the like showing a mutual relationship between the number of revolutions, the torque, the eddy current loss $W2_{coil}$ of the coil 21, and the like according to the applied voltage in the storage 55 as shown in FIG. 7. The heating value calculation part 51 calculates the eddy current loss $W2_{coil}$ of the coil 21 with reference to the data previously stored in the storage 55 using the applied voltage, the number of revolutions and the torque detected by the sensors 41, 44 and 46. For example, the heating value calculation part 51 calculates the eddy current loss W2$_{coil}$ of the coil 21 while performing linear interpolation or the like with respect to the applied voltage and the number of revolutions using the map showing the mutual relationship between the torque and the eddy current loss W2$_{coil}$ of the coil 21 with respect to a combination of a plurality of different applied voltages and the number of revolutions (N1<N2<N3<N4).

The heating value calculation part 51 calculates the iron loss W$_{sta}$ of the stator core 22a according to the applied voltage detected by the voltage sensor 41, the number of revolutions of the driving motor 11 detected by the first number-of-revolutions sensor 44, and the torque of the driving motor 11 detected by the torque sensor 46.

Figure 8:
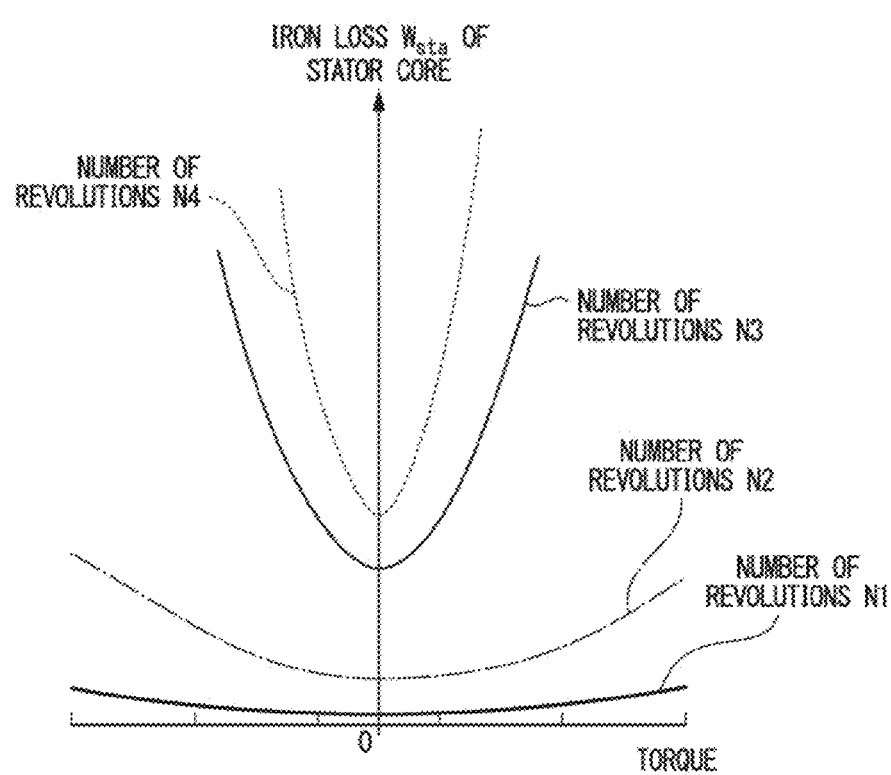
FIG. 8 is a view showing a mutual relationship between the number of revolutions, torque, and iron loss of a stator core in the driving motor of the winding temperature estimation device for a rotating electric machine according to the embodiment of the present invention.

As shown in FIG. 8, the heating value calculation part 51 previously stores the data such as a map or the like showing a mutual relationship between the number of revolutions, the torque, and the iron loss W$_{sta}$ of the stator core 22a according to the applied voltage in the storage 55. The heating value calculation part 51 calculates the iron loss W$_{sta}$ of the stator core 22a with reference to the data previously stored in the storage 55 using the applied voltage, the number of revolutions, and the torque detected by the sensors 41, 44 and 46. For example, the heating value calculation part 51 calculates the iron loss W$_{sta}$ of the stator core 22a while performing linear interpolation or the like with respect to the applied voltage and the number of revolutions using the map showing the mutual relationship between the torque and the iron loss W$_{sta}$ of the stator core 22a with respect to a combination of a plurality of different applied voltages and the number of revolutions (N1<N2<N3<N4).

The heat reduction amount calculation part 52 calculates a heat receiving amount Q$_{coil}$ of the coil 21 according to the coolant temperature after passing through the cooler detected by the coolant temperature sensor 47 and the number of revolutions of the generating motor 12 detected by the second number-of-revolutions sensor 45.

Figure 9:
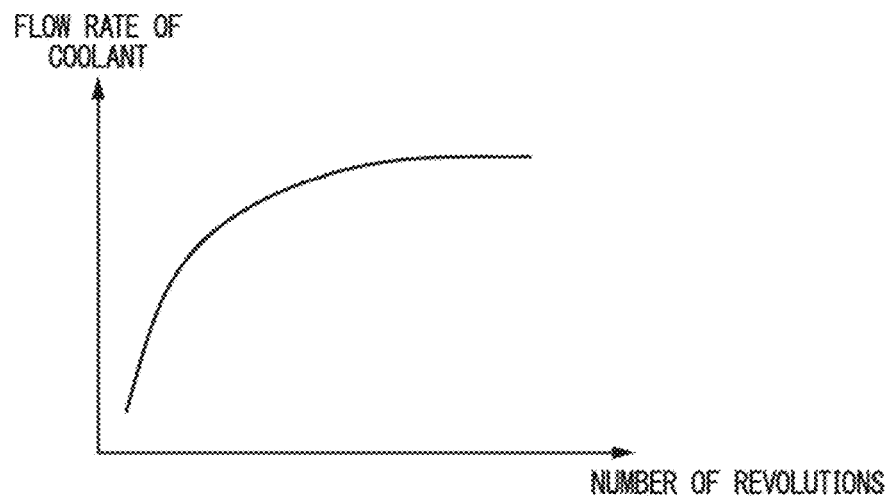
FIG. 9 is a view showing a mutual relationship between the number of revolutions of a generating motor and a flow rate of a coolant in the winding temperature estimation device for a rotating electric machine according to the embodiment of the present invention.

The heat reduction amount calculation part 52 detects a flow rate of the coolant circulating through the coolant circulation section 14 according to the number of revolutions of the generating motor 12 detected by the second number-of-revolutions sensor 45. As shown in FIG. 9, the winding temperature calculation part 53 previously stores data such as a map showing a mutual relationship between the number of revolutions of the generating motor 12 and the flow rate of the coolant in the storage 55.

The winding temperature calculation part 53 calculates a flow rate of the coolant with reference to the data previously stored in the storage 55 using the number of revolutions detected by the second number-of-revolutions sensor 45.

The heat reduction amount calculation part 52 calculates a heat receiving amount Q$_{sta-atf}$ of the coolant from the stator core 22a and a heat receiving amount Q$_{coil-sta}$ from the coil 21 of the stator core 22a according to a coolant temperature T$_{atf}$ after passing through the cooler detected by the coolant temperature sensor 47, a temperature (a last count) T$_{sta(pre)}$ of the stator core 22a, a temperature (a last count) T$_{coil(pre)}$ of the coil 21, and a flow rate of the coolant.

Figure 10:
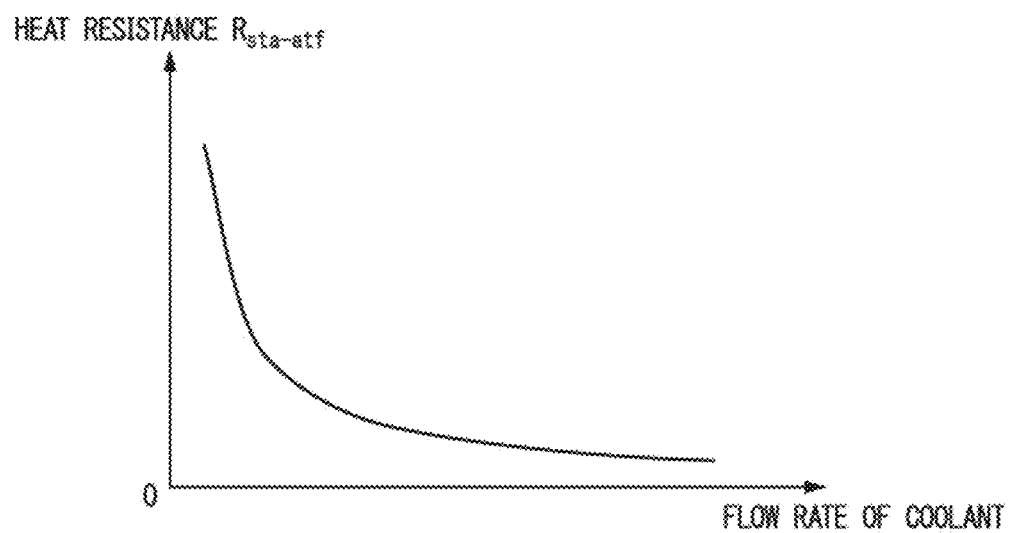
FIG. 10 is a view showing a mutual relationship between heat resistance between the coolant and the stator core, and a flow rate of the coolant in the driving motor of the winding temperature estimation device for a rotating electric machine according to the embodiment of the present invention.

For example, as shown in FIG. 10, the heat reduction amount calculation part 52 previously stores data such as a map or the like showing a mutual relationship between a heat resistance R$_{sta-aft}$ between the coolant and the stator core 22a and a flow rate of the coolant in the storage 55. The heat reduction amount calculation part 52 previously stores data such as a map or the like showing a mutual relationship between a heat resistance R$_{coil-sta}$ between the stator core 22a and the coil 21 and a flow rate of the coolant in the storage 55.

The heat reduction amount calculation part 52 calculates the heat resistance R$_{sta-atf}$ between the coolant and the stator core 22a and the heat resistance R$_{coil-sta}$ between the stator core 22a and the coil 21 while performing linear interpolation or the like with respect to the flow rate with reference to the data previously stored in the storage 55 using the calculated flow rate of the coolant.

As expressed in the following Equation (2), the heat reduction amount calculation part 52 calculates the heat receiving amount Q$_{sta-atf}$ using the calculated heat resistance R$_{sta-atf}$, the coolant temperature T$_{atf}$ after passing through the cooler and the temperature (the last count) T$_{sta(pre)}$ of the stator core 22a. As expressed in the following Equation (3), the heat reduction amount calculation part 52 calculates a heat receiving amount Q$_{coil-sta(pre)}$ using the calculated heat resistance R$_{coil-sta}$, the temperature (the last count) T$_{sta(pre)}$ of the stator core 22a and the temperature (the last count) T$_{coil(pre)}$ of the coil 21.

[Math. 2]

$$Q_{sta\text{-}atf} = \frac{1}{R_{sta\text{-}atf}} \times (T_{sta(pre)} - T_{atf}) \tag{2}$$

[Math. 3]

$$Q_{coil\text{-}sta(pre)} = \frac{1}{R_{coil\text{-}sta}} \times (T_{coil(pre)} - T_{sta(pre)}) \tag{3}$$

As expressed in the following Equation (4), the heat reduction amount calculation part 52 calculates a heat receiving amount Q$_{sta}$ of the stator core 22a according to the calculated heat receiving amount Q$_{sta-atf}$, the calculated heat receiving amount Q$_{coil-sta(pre)}$, and the iron loss W$_{sta}$ of the stator core 22a.

As expressed in the following Equation (5), the heat reduction amount calculation part 52 calculates a temperature variation ΔT$_{sta}$ of the stator core 22a using the calculated heat receiving amount Q of the stator core 22a, and a heat capacity C$_{sta}$ of the stator core 22a previously stored in the storage 55.

As expressed in the following Equation (6), the heat reduction amount calculation part 52 calculates a temperature T$_{sta}$ of the stator core 22a using the temperature variation ΔT$_{sta}$ of the stator core 22a and the temperature (the last count) T$_{sta(pre)}$ of the stator core 22a.

[Math. 4]

$$Q_{sta} = W_{sta} - Q_{sta\text{-}atf} + Q_{coil\text{-}sta(pre)} \tag{4}$$

[Math. 5]

$$\Delta T_{sta} = \frac{Q_{sta}}{C_{sta}} \tag{5}$$

[Math. 6]

$$T_{sta} = T_{sta(pre)} + \Delta T_{sta} \tag{6}$$

The heat reduction amount calculation part 52 calculates the heat receiving amount Q$_{coil}$ of the coil 21 according to the coolant temperature T$_{atf}$ after passing through the cooler detected by the coolant temperature sensor 47, the calculated temperature T$_{sta}$ of the stator core 22a, the temperature (the last count) T$_{coil(pre)}$ of the coil 21, and a flow rate of the coolant.

The heat reduction amount calculation part 52 previously stores data such as a map or the like showing a mutual relationship between a heat resistance $R_{coil\text{-}atf}$ between the coolant and the coil 21 and a flow rate of the coolant in the storage 55. The heat reduction amount calculation part 52 calculates the heat resistance $R_{coil\text{-}atf}$ between the coolant and the coil 21 and the heat resistance $R_{coil\text{-}atf}$ between the stator core 22a and the coil 21 while performing linear interpolation or the like with respect to the flow rate with reference to the data previously stored in the storage 55 using the calculated flow rate of the coolant.

As expressed in the following Equation (7), the heat reduction amount calculation part 52 calculates a heat receiving amount $Q_{coil\text{-}atf}$ of the coolant from the coil 21 using the calculated heat resistance $R_{coil\text{-}atf}$, the coolant temperature $T_{atf}$ after passing through the cooler, and the temperature (the last count) $T_{coil(pre)}$ of the coil 21.

As expressed in the following Equation (8), the heat reduction amount calculation part 52 calculates the heat receiving amount $Q_{coil\text{-}sta}$ using the calculated heat resistance $R_{coil\text{-}sta}$, the calculated the temperature $T_{sta}$ of the stator core 22a, and the temperature (the last count) $T_{coil(pre)}$ of the coil 21.

As expressed in the following Equation (9), the beat reduction amount calculation part 52 calculates the heat receiving amount $Q_{coil}$ of the coil 21 according to the copper loss $W1_{coil}$ and the eddy current loss $W2_{coil}$ of the coil 21 using the calculated heat receiving amount $Q_{coil\text{-}atf}$ and the heat receiving amount $Q_{coil\text{-}atf}$ serving as a heat reduction amount (a radiation amount) of the coil 21.

[Math. 7]
$$Q_{coil\text{-}atf} = \frac{1}{R_{coil\text{-}atf}} \times (T_{coil(pre)} - T_{atf}) \quad (7)$$

[Math. 8]
$$Q_{coil\text{-}sta} = \frac{1}{R_{coil\text{-}sta}} \times (T_{coil(pre)} - T_{sta}) \quad (8)$$

[Math. 9]
$$Q_{coil} = W1_{coil} + W2_{coil} - Q_{coil\text{-}atf} - Q_{coil\text{-}sta} \quad (9)$$

As expressed in the following Equation (10), the winding temperature calculation part 53 calculates a temperature variation $\Delta T_{coil}$ of the coil 21 using the calculated heat receiving amount $Q_{coil}$ of the coil 21 and the heat capacity $C_{coil}$ of the coil 21 previously stored in the storage 55.

As expressed in the following Equation (11), the winding temperature calculation part 53 calculates the temperature $T_{coil}$ of the coil 21 using the temperature variation $\Delta T_{coil}$ of the coil 21 and the temperature (the last count) $T_{coil(pre)}$ of the coil 21.

[Math. 10]
$$\Delta T_{coil} = \frac{Q_{coil}}{C_{coil}} \quad (10)$$

[Math. 11]
$$T_{coil} = T_{coil(pre)} + \Delta T_{coil} \quad (11)$$

The motor controller 54 controls the driving motor 11 and the generating motor 12 by outputting a control signal configured to control the transmission 13 and the power conversion part 15 based on the temperature $T_{coil}$ of the coil 21 calculated by the winding temperature calculation part 53.

The winding temperature estimation device 10 for a rotating electric machine according to the embodiment includes the above-mentioned configuration, and hereinafter, an operation of the winding temperature estimation device 10 for a rotating electric machine, i.e., a winding temperature estimation method for a rotating electric machine will be described.

Hereinafter, processing in which the control device 17 calculates the temperature $T_{coil}$ of the coil 21 of the driving motor 11 and controls the driving motor 11 will be described.

Figure 11:
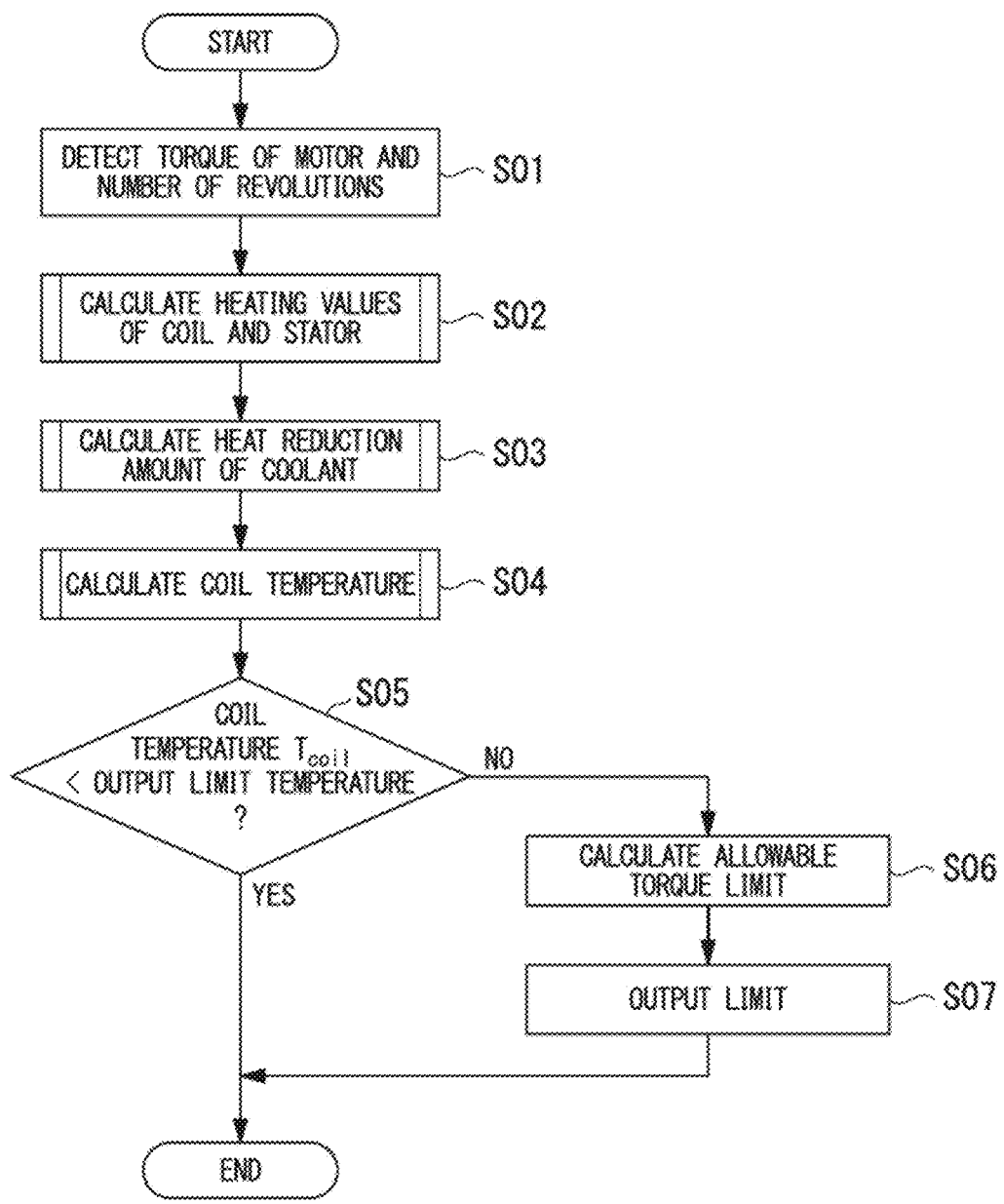
FIG. 11 is a flowchart showing an operation of the winding temperature estimation device for a rotating electric machine according to the embodiment of the present invention.

First, as shown in FIG. 11, the control device 17 acquires torque of the driving motor 11 detected by the torque sensor 46 and the number of revolutions of the driving motor 11 detected by the first number-of-revolutions sensor 44 (step S01).

Next, the control device 17 calculates a heating value due to a loss of the coil 21 and the stator core 22a (step S02).

Next, the control device 17 calculates a heat reduction amount (a radiation amount) from the coil 21 by a coolant (step S03).

Next, the control device 17 calculates the temperature $T_{coil}$ of the coil 21 (step S04).

Next, the control device 17 determines whether the calculated temperature $T_{coil}$ of the coil 21 is less than a predetermined output limit temperature (step S05).

When the determination result is "YES," the control device 17 terminates the processing without performing output limitation of the driving motor 11 (YES in step S05).

On the other hand, when the determination result is "NO," the control device 17 advances the processing to step S06 (NO in step S05).

Then, the control device 17 calculates an allowable torque upper limit of the driving motor 11 (step S06).

Next, the control device 17 outputs a control signal instructing that the torque of the driving motor 11 is the allowable torque upper limit or less to the power conversion part 15 (step S07). Then, the control device 17 terminates the processing.

Hereinafter, heating value calculation processing of the coil 21 and the stator core 22a in the above-mentioned step S02 will be described.

Figure 12:
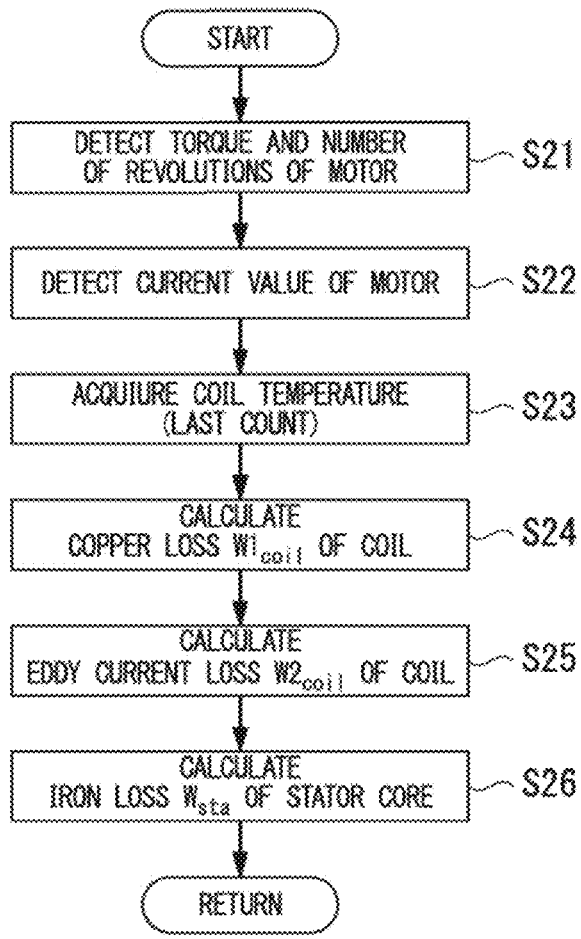
FIG. 12 is a flowchart showing calculation process of heating values of the coil and the stator shown in FIG. 11.

First, as shown in FIG. 12, the control device 17 acquires torque of the driving motor 11 detected by the torque sensor 46 and the number of revolutions of the driving motor 11 detected by the first number-of-revolutions sensor 44 (step S21).

Next, the control device 17 acquires the 3-phase current (i.e., alternating current of the 3-phase coil 21) I of the driving motor 11 detected by the second current sensor 43 (step S22).

Next, the control device 17 acquires the temperature (the last count) $T_{coil(pre)}$ of the coil 21 (step S23).

Next, the control device 17 calculates the copper loss $W1_{coil}$ of the 3-phase coil 21 according to the acquired phase current I of the 3-phase coil 21 and the resistance value R of the 3-phase coil 21 previously stored in the storage 55 (step S24).

Next, the control device 17 calculates the eddy current loss $W2_{coil}$ of the coil 21 according to an applied voltage detected by the voltage sensor 41, the number of revolutions of the driving motor 11 detected by the first number-of-revolutions sensor 44, and the torque of the driving motor 11 detected by the torque sensor 46 (step S25).

Next, the control device 17 calculates the iron loss $W_{sta}$ of the stator core 22a with reference to data previously stored in the storage 55 using the acquired torque, the number of revolutions, and the applied voltage (step S26). Then, the control device 17 terminates the processing.

Hereinafter, coolant heat reduction amount calculation processing of the above-mentioned step S03 will be described.

Figure 13:
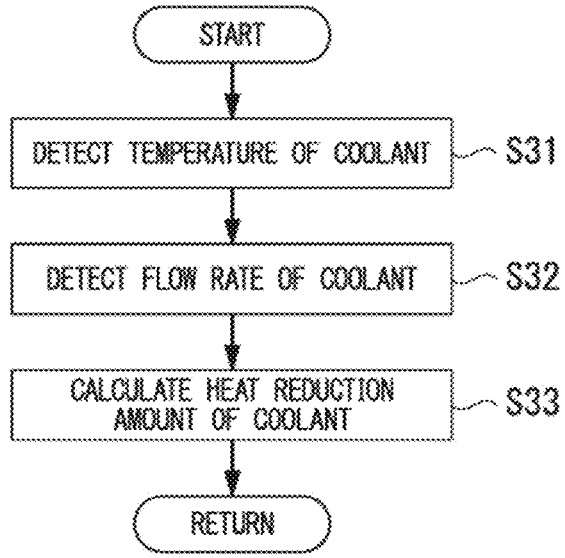
FIG. 13 is a flowchart showing calculation process of a coolant heat reduction amount shown in FIG. 11.

First, as shown in FIG. 13, the control device 17 acquires the coolant temperature $T_{atf}$ after passing through a cooler detected by the coolant temperature sensor 47 (step S31).

Next, the control device 17 calculates a flow rate $F_{atf}$ of the coolant with reference to data previously stored in the storage 55 using the number of revolutions detected by the second number-of-revolutions sensor 45 or acquires the flow rate $F_{atf}$ of the coolant from a flow rate sensor or the like (step S32).

Next, the control device 17 calculates the heat resistances $R_{sta-atf}$, $R_{coil-sta}$ and $R_{coil-atf}$ with reference to the data previously stored in the storage 55 using the flow rate $F_{atf}$ of the coolant.

Then, as expressed in the above-mentioned Equation (2) to (8), the control device 17 calculates the heat receiving amount $Q_{coil-atf}$ and the heat receiving amount $Q_{coil-sta}$ serving as a heat reduction amount of the coil 21 (i.e., a radiation amount of the coil 21) by the coolant.

Then, the control device 17 calculates the heat receiving amount $Q_{coil}$ of the coil 21 according to the heat reduction amount (the radiation amount) of the coil 21 and the copper loss $W1_{coil}$ and the eddy current loss $W2_{coil}$ of the coil 21 (step S33). Then, the control device 17 terminates the processing.

Hereinafter, coil temperature calculation processing of the above-mentioned step S04 will be described.

As expressed in the above-mentioned Equation (10), the control device 17 calculates the temperature variation $\Delta T_{coil}$ of the coil 21 using the calculated heat receiving amount $Q_{coil}$ of the coil 21 and the heat capacity $C_{coil}$ of the coil 21 previously stored in the storage 55.

As expressed in the above-mentioned Equation (11), the control device 17 calculates the temperature $T_{coil}$ of the coil 21 using the temperature variation $\Delta T_{coil}$ of the coil 21 and the temperature (the last count) $T_{coil(pre)}$ of the coil 21. Then, the control device 17 terminates the processing.

As described above, the winding temperature estimation device 10 and the winding temperature estimation method for a rotating electric machine according to the embodiment include the control device 17 configured to calculate the temperature $T_{coil}$ of the coil 21 using the temperature $T_{atf}$ of the coolant. For this reason, calculation precision of the temperature T of the coil 21 can be improved.

In addition, the winding temperature estimation device 10 and the winding temperature estimation method for a rotating electric machine according to the embodiment include the control device 17 using a heat model in which the coolant cools at least a portion of the coil 21 outside the slot 22c and the stator core 22a. For this reason, the temperature $T_{coil}$ of the coil 21 can be precisely calculated according to a cooling path of the coolant in the driving motor 11 and the cooling state of the coil 21 and the stator core 22a.

Further, the winding temperature estimation device 10 and the winding temperature estimation method for a rotating electric machine according to the embodiment include the control device 17 configured to calculate the heat reduction amount (i.e., the radiation amount) from the coil 21 using the temperature $T_{sta}$ of the stator core 22a having a strong thermal relation with the coil 21 in the slot 22c. For this reason, the radiation amount from the coil 21 by the coolant can be precisely calculated.

Further, the winding temperature estimation device 10 and the winding temperature estimation method for a rotating electric machine according to the embodiment include the control device 17 configured to calculate a heating value according to a copper loss and eddy current loss of the coil 21. For this reason, a temperature variation according to the heating value of the coil 21 can be precisely calculated.

Further, the winding temperature estimation device 10 and the winding temperature estimation method for a rotating electric machine according to the embodiment include the control device 17 configured to acquire the heat resistances $R_{sta-atf}$, $R_{coil-sta}$, and $R_{coil-atf}$ according to the flow rate of the coolant. For this reason, the heat resistances can be precisely calculated according to states of the coolant at least at a portion of the coil 21 outside the slot 22c and at the stator core 22a.

Further, in the above-mentioned embodiment, while the control device 17 acquires the flow rate of the coolant from the number of revolutions of the generating motor 12 because the mechanical pump of the coolant circulation section 14 is connected to the rotary shaft of the generating motor 12, it is not limited thereto. For example, when the coolant circulation section 14 includes the flow rate sensor configured to detect the flow rate of the coolant in the coolant flow path 14a, the flow rate of the coolant detected by the flow rate sensor may be acquired. Further, the coolant circulation section 14 may include an electric pump instead of the mechanical pump.

Further, in the above-mentioned embodiment, while the winding temperature estimation device 10 for a rotating electric machine includes the torque sensor 46, it is not limited thereto and the torque sensor 46 may be omitted. The control device 17 may acquire a torque indicated value according to an alternating current flowing through the coils 21 of the driving motor 11 detected by the second current sensor 43 and a rotation angle of the driving motor 11 detected by the first number-of-revolutions sensor 44.

The above-mentioned embodiment is exemplarily proposed but is not intended to limit the scope of the present invention. The above-mentioned novel embodiment may be performed as other various types, and may be variously omitted, substituted and modified without departing from the scope of the present invention. The above-mentioned embodiment or the variants thereof are included in the range or the scope of the present invention and included in a range equivalent to the invention disclosed in the range of the claims.

REFERENCE SIGNS LIST

10 Winding temperature estimation device of rotating electric machine
11 Driving motor (rotating electric machine)
12 Generating motor
13 Transmission
14 Coolant circulation section (coolant supply part)
14b Cooler (cooling part)
15 Power conversion part
16 Battery
17 Control device
21 Coil
21a Segment coil 22 Stator
22a Stator core
22b Teeth
22c Slot
23 Magnet
24 Rotor
24a Rotor yoke
24b End surface plate
51 Heating value calculation part
52 Heat reduction amount calculation part
53 Winding temperature calculation part
54 Motor controller
55 Storage

The invention claimed is:

1. A winding temperature estimation device for a rotating electric machine comprising:
    a rotating electric machine comprising a stator, which has slots and a winding configured with a plurality of segmented conducting wires that are inserted into the slots according to a shape of the slots and that have wire widths corresponding to widths of the slots, and a rotor;
    a coolant supply part configured to supply a coolant to the winding and the stator;
    a temperature sensor configured to detect a temperature of the coolant;
    a heat reduction amount calculation part configured to calculate a heat reduction amount from the winding using the temperature of the coolant and a heat resistance of at least a portion between the coolant and the winding;
    a heating value calculation part configured to calculate the heating value based on a copper loss and an eddy current loss of the winding; and
    a winding temperature calculation part configured to calculate a temperature of the winding using the heat reduction amount from the winding and the heating value due to the loss of the winding.

2. The winding temperature estimation device for a rotating electric machine according to claim 1,
    wherein the heating value calculation part comprises a stator heating value calculation part configured to calculate a heating value due to an iron loss of the stator,
    wherein the heat reduction amount calculation part comprises a stator temperature calculation part configured to calculate a temperature of the stator using the heating value due to the iron loss of the stator, the temperature of the coolant, and a heat resistance between the coolant and the stator, and
    wherein the heat reduction amount from the winding is calculated using the temperature of the stator, a heat resistance between the stator and the winding, the temperature of the coolant, and the heat resistance between the coolant and the winding.

3. The winding temperature estimation device for a rotating electric machine according to claim 1,
    wherein the heat reduction amount calculation part calculates heat resistances according to a flow rate of the coolant and number of revolutions of the rotating electric machine.

4. The winding temperature estimation device for a rotating electric machine according to claim 2,
    wherein the heat reduction amount calculation part calculates heat resistances according to a flow rate of the coolant and number of revolutions of the rotating electric machine.

5. A winding temperature estimation method for a rotating electric machine
    comprising a stator, which has slots and a winding constituted by a plurality of segmented conducting wires that are inserted into the slots according to a shape of the slots and that have wire widths corresponding to widths of the slots, a rotor, and a coolant supply part configured to supply a coolant to the winding and the stator;
said method comprising:
    detecting a temperature of the coolant;
    calculating a heat reduction amount from the winding using the temperature of the coolant and a heat resistance of at least a portion between the coolant and the winding;
    calculating the heating value based on a copper loss and an eddy current loss of the winding, and
    calculating a temperature of the winding using the heat reduction amount of the winding and the heating value due to the loss of the winding.

* * * * *